(12) United States Patent
Kim et al.

(10) Patent No.: US 8,590,922 B2
(45) Date of Patent: Nov. 26, 2013

(54) RAMP BRACKET FOR CURTAIN AIRBAG

(75) Inventors: Eung Seo Kim, Hwaseong-si (KR); Byung Ho Min, Seoul (KR)

(73) Assignees: Hyundai Motor Company, Seoul (KR); Kia Motors Corp., Seoul (KR); Autoliv Development AB, Vargarda (SE)

( * ) Notice: Subject to any disclaimer, the term of this patent is extended or adjusted under 35 U.S.C. 154(b) by 99 days.

(21) Appl. No.: 13/169,761

(22) Filed: Jun. 27, 2011

(65) Prior Publication Data

US 2012/0119048 A1 May 17, 2012

(30) Foreign Application Priority Data

Nov. 12, 2010 (KR) .................. 10-2010-0112846

(51) Int. Cl.
*B60R 21/16* (2006.01)
(52) U.S. Cl.
USPC ............... 280/728.2; 280/730.2; 248/694
(58) Field of Classification Search
USPC .......... 248/225.21, 220.21, 694; 280/728.2, 280/730.2, 730.1, 728.1
See application file for complete search history.

(56) References Cited

U.S. PATENT DOCUMENTS

| | | | | |
|---|---|---|---|---|
| 7,357,408 | B2 * | 4/2008 | Hall et al. | 280/728.2 |
| 7,669,343 | B2 | 3/2010 | Reynolds | |
| 7,934,746 | B2 * | 5/2011 | Glaser et al. | 280/728.3 |
| 8,172,258 | B2 * | 5/2012 | Kim et al. | 280/728.2 |
| 8,220,826 | B2 * | 7/2012 | Park et al. | 280/728.2 |
| 2003/0230878 | A1 * | 12/2003 | Inoue | 280/730.2 |
| 2006/0138750 | A1 * | 6/2006 | Park | 280/728.2 |
| 2006/0255568 | A1 * | 11/2006 | Demel et al. | 280/728.2 |
| 2007/0132217 | A1 * | 6/2007 | Seong | 280/730.2 |
| 2008/0061535 | A1 * | 3/2008 | Everard et al. | 280/728.2 |
| 2009/0085329 | A1 * | 4/2009 | Kwak et al. | 280/728.2 |
| 2011/0115199 | A1 * | 5/2011 | Shimazaki et al. | 280/728.2 |

\* cited by examiner

*Primary Examiner* — Nkeisha Smith
(74) *Attorney, Agent, or Firm* — Morgan, Lewis & Bockius LLP

(57) ABSTRACT

A ramp bracket for a curtain airbag is constructed so that an open space between a front and a rear is divided into two portions, that is, an upper chamber and a lower chamber by a partition, and the front and the rear are separated from each other at an area defining the lower chamber. Such a ramp bracket allows the airbag to be smoothly deployed between a head liner and a pillar trim, and minimizes the injury to a passenger who collides with the ramp bracket.

10 Claims, 6 Drawing Sheets

RAMP BRACKET FOR CURTAIN AIRBAG

CROSS-REFERENCE TO RELATED APPLICATIONS

The present application claims priority to Korean Patent Application No. 10-2010-0112846 filed on Nov. 12, 2010, the entire contents of which application is incorporated herein for all purposes by this reference.

BACKGROUND OF THE INVENTION

1. Field of the Invention

The present invention relates to a ramp bracket for a curtain airbag, which is intended to guide the deployment of the airbag between a head liner and a pillar trim.

2. Description of the Related Art

Generally, a curtain airbag is installed along a roof side rail from an A-pillar to a C-pillar.

The curtain airbag which is deployed while pushing a head liner may be caught by a pillar trim, especially an upper end of a B-pillar trim, so that a deployment time may be delayed or a deployment may be irregular.

Thus, in order to prevent the pillar trim from causing irregular deployment of the curtain airbag, as seen in U.S. Pat. No. 7,699,343, a ramp bracket is installed at a position of a vehicle body corresponding to an upper end of the pillar trim to allow the airbag to be deployed without the interference of the pillar trim.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

Accordingly, the present invention has been made keeping in mind the above problems occurring in the related art, and various aspects of the present invention provide for a ramp bracket for a curtain airbag, which has rigidity capable of supporting the airbag that is rapidly inflated by high-pressure gas.

Further, other aspects of the present invention provide for a ramp bracket for a curtain airbag, which has the above-mentioned rigidity, and is easily deformed against load transmitted from a passenger compartment, thus minimizing the injury to a passenger who collides with the ramp bracket.

According to various aspects of the present invention, the ramp bracket for a curtain airbag includes a front which has airbag deployment lines formed in a horizontal direction, a rear placed behind the front with a space being formed between the rear and the front, the space being open at both left and right sides thereof, and a partition dividing the space into two portions that are an upper chamber and a lower chamber.

According to an aspect of the present invention, the front and the rear may be separated from each other at an area defining the lower chamber.

According to another aspect of the present invention, a portion of the partition adjacent to the rear may be thicker than a portion of the partition adjacent to the front.

According to a further aspect of the present invention, the rear may include a support part which is bent from a lower end of the area defining the lower chamber and extends towards the front.

According to another aspect of the present invention, the front may include a skirt extending downwards from a portion to which the partition is connected, and the skirt may overlap the support part in front of the support part.

According to another aspect of the present invention, the skirt may be thicker than the front of an area defining the upper chamber.

According to another aspect of the present invention, a notch may be formed at a portion bent from a lower end of the rear so that the support part is easily bent upwards.

According to another aspect of the present invention, a portion of the support part adjacent to the rear may be thicker than a portion of the support part adjacent to the front.

According to another aspect of the present invention, the support part may include a stopper which is provided on a front end of the support part in such a way as to be positioned between the partition and the skirt and leans on the skirt to withstand a force transmitted from the partition.

According to another aspect of the present invention, the stopper may have on a top thereof a flat surface which is in surface contact with the partition.

According to another aspect of the present invention, the airbag deployment lines may be lines which are cut at regular intervals so that a rupture is conducted along the lines.

According to another aspect of the present invention, a thickness of the partition may not be constant so that a portion of the partition adjacent to the front is different from a portion of the partition adjacent to the rear.

According to another aspect of the present invention, the front, rear and partition of an area defining the lower chamber may be more rigid and thicker than the front of an area defining the upper chamber.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
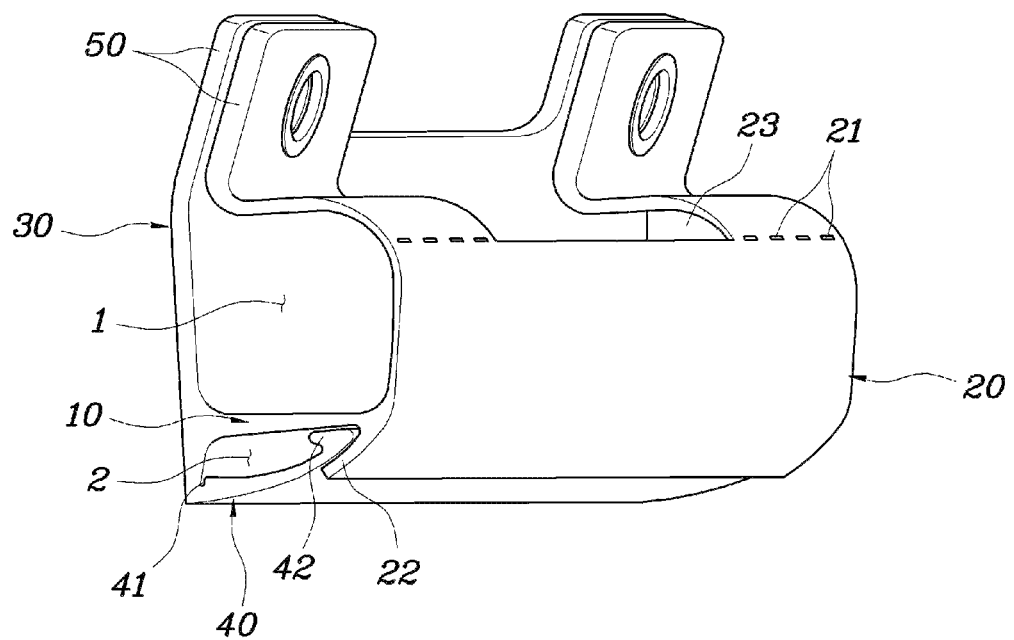
FIG. 1 is a view illustrating an exemplary ramp bracket for a curtain airbag according to the present invention.

Referring to FIG. 1, the ramp bracket for the curtain airbag according to various embodiments includes a front 20 which is installed in a vehicle in such a way as to be placed towards a passenger compartment, a rear 30 which is placed towards a vehicle body, and a partition 10 which divides a space between the front 20 and the rear 30 into two portions.

The partition 10 connects the front 20 to the rear 30 to divide the space into an upper chamber 1 and a lower chamber 2. Each of the upper and lower chambers 1 and 2 is open at both left and right sides thereof, and the airbag is inserted into the upper chamber 1 in a transverse direction from the left to the right.

The front 20 is provided with airbag deployment lines 21 which are cut at regular intervals in a horizontal direction, as one example. When the airbag is deployed, the ramp bracket is ruptured along the deployment lines 21. A cut part 23 is formed in the central portion of the upper end of the front 20 so that the ramp bracket is easily ruptured along the deployment lines 21.

The front 20 includes a skirt 22 extending do ds from a portion to which the partition 10 is connected. In order to correspond to the skirt 22, the rear 30 includes a support part 40 which is bent from the lower end of an area defining the lower chamber 2 and extends towards the front 20.

At the area defining the lower chamber 2, the front 20 and the rear 30 are not connected or secured to each other but are separated from each other in such a way as to partially overlap each other. According to one example, the skirt 22 is not coupled to the support part 40, and merely overlaps the support part 40 in front of the support part 40.

Figure 2:
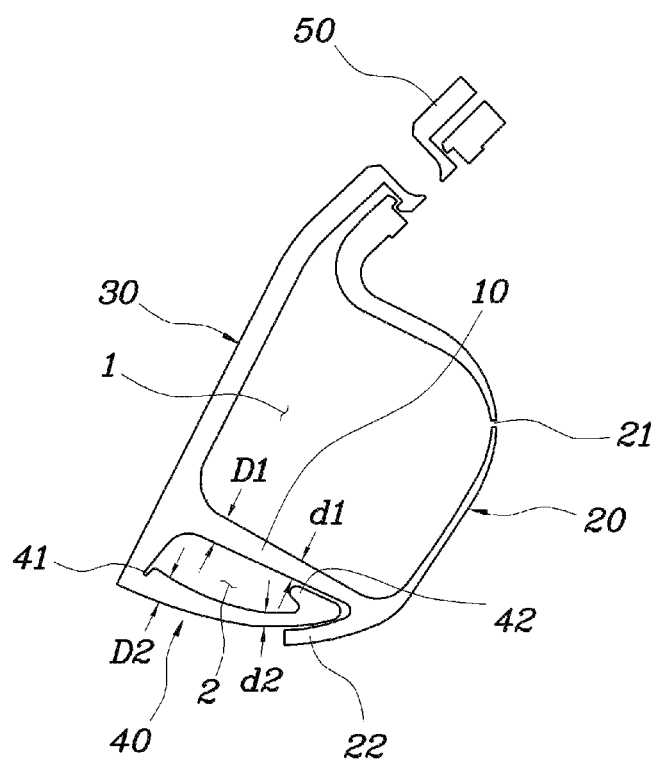
FIG. 2 is a schematic side sectional view illustrating the ramp bracket of FIG. 1.
Figure 3:
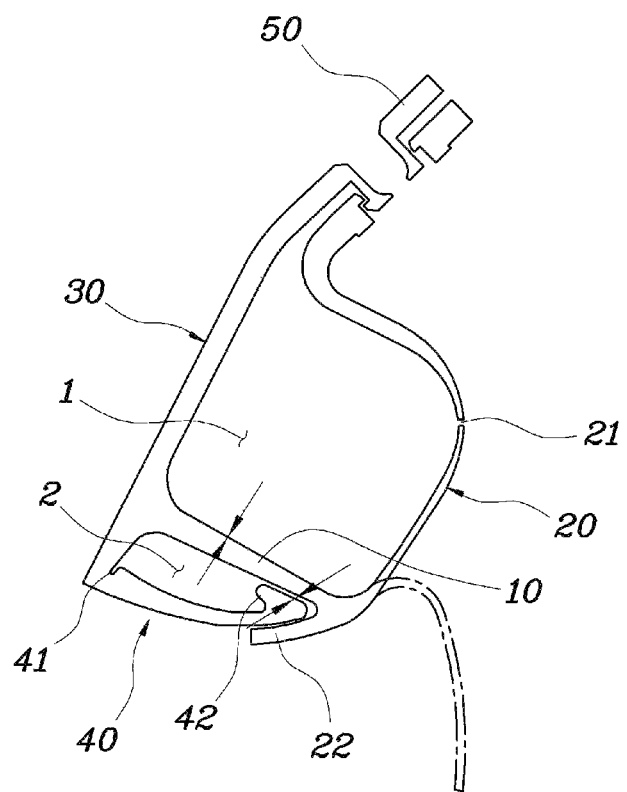
FIG. 3 is a view illustrating a structure wherein the ramp bracket of FIG. 2 supports the bag during the deployment of the curtain airbag.

Further, according to one example, as shown in FIGS. 2 and 3, the front 20, the rear 30 and the partition 10 of the area defining the lower chamber 2 are more rigid and thicker than the front of an area defining the upper chamber 1. Such a structure guarantees a support force to act against the deploying force of the airbag, in addition to enabling the easy deployment of the airbag.

Meanwhile, the thickness of the partition 10 is not constant. That is, the thickness of a portion of the partition 10 adjacent to the front 20 is different from that of a portion of the partition 10 adjacent to the rear 30. For example, as shown in FIGS. 2 and 3, the portion of the partition 10 adjacent to the rear 30 is thicker than the portion of the partition 10 adjacent to the front 20 (D1>d1). Such a partition 10 may support the airbag which is rapidly inflated, and besides, may be easily deformed by an impact force transmitted from the skirt 22.

As another example, the portion of the partition 10 adjacent to the front 20 may be thicker than the portion of the partition 10 adjacent to the rear 30. However, even in this case, it is necessary to form the partition 10 so that it provides support rigidity against the deploying force of the airbag and is deformed to some degree easily by an impact force transmitted from the front 20.

As shown FIGS. 2 and 3, the support part 40 includes a stopper 42. The stopper 42 is provided on a front end of the support part 40 in such a way as to be positioned between the partition 10 and the skirt 22, and leans on the skirt 22 to withstand a force applied by the partition 10. The stopper 42 has on its top a flat surface which is in surface contact with the partition 10.

Figure 4:
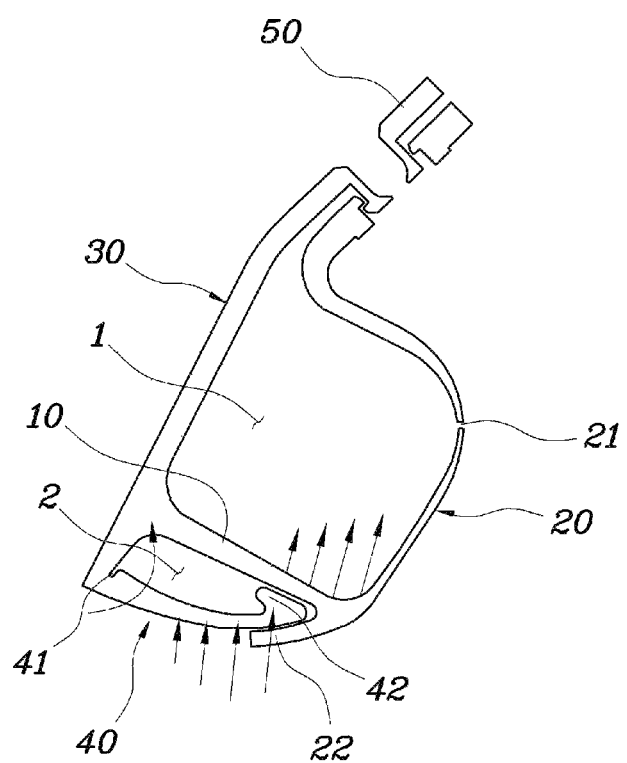
FIG. 4 is a view illustrating a structure wherein the ramp bracket of FIG. 2 absorbs external shocks.

As shown in FIGS. 2 and 4, a notch 41 is formed on a bent portion of the lower end of the rear 30 from which the support part 40 is formed, and allows the support part 40 to be easily bent upwards. While the support part 40 is bent upwards by the impact force transmitted from the skirt 22, the support part 40 absorbs the impact force.

As one example, a portion of the support part 40 adjacent to the rear 30 is thicker than a portion of the support part 40 adjacent to the front 20 (D2>d2). In this case, the support part 40 is easily deformed to absorb the impact force transmitted from the skirt 22.

Meanwhile, remaining shocks which are not absorbed by the support part 40 are transmitted through the stopper 42 to the front end of the partition 10. In this case, while the front end of the partition 10 and the front 20 which are thin are deformed, they absorb the remaining shocks.

Figure 5:
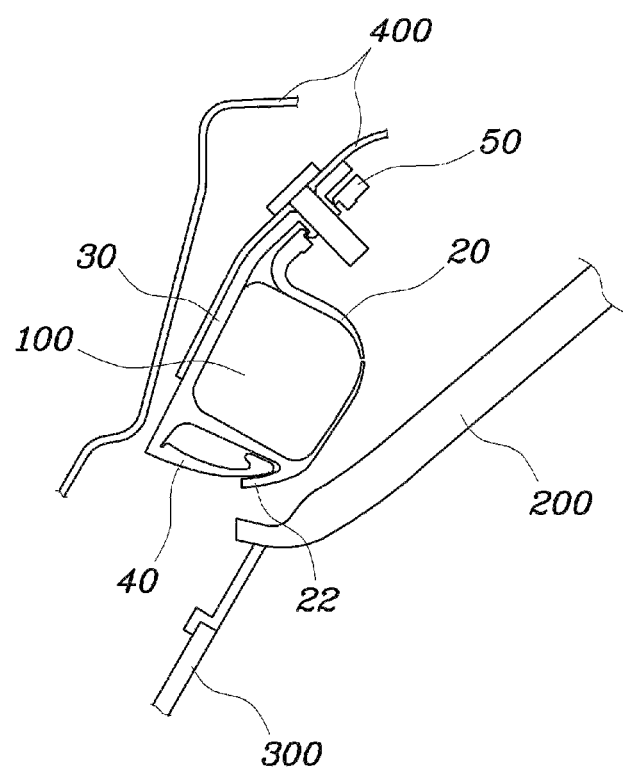
FIG. 5 is a view illustrating the ramp bracket of FIG. 2 mounted to a vehicle body.
Figure 6:
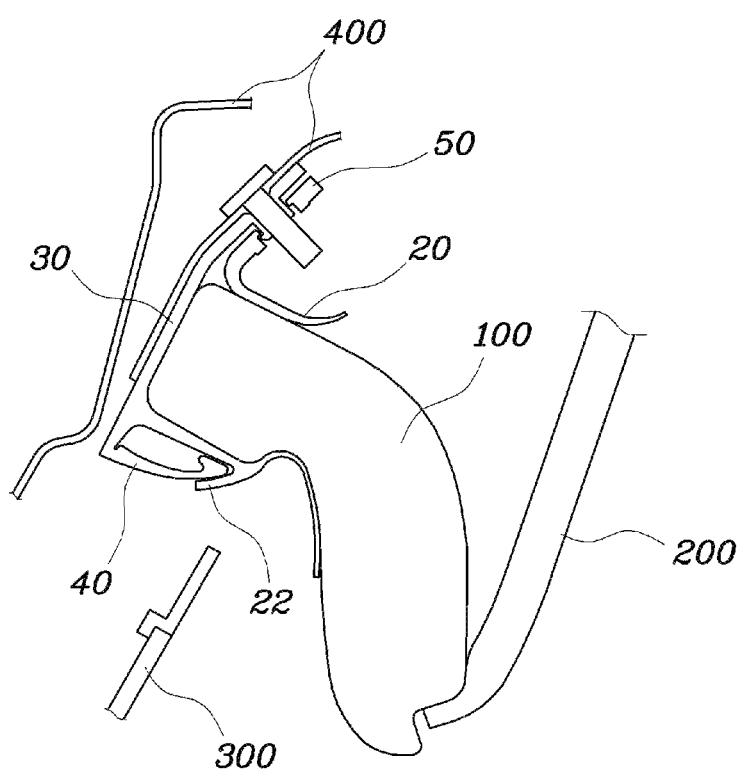
FIG. 6 is a view illustrating the ramp bracket of FIG. 2 as it guides the deployment of the curtain airbag.

Referring to FIGS. 5 and 6, a portion of the front 20 which is separated after being ruptured along the airbag deployment lines 21, that is, a portion of the front 20 which is positioned under the deployment lines 21 is opened towards the passenger compartment, thus serving as a bridge that connects the ramp bracket to the upper end of a pillar trim 300. The portion of the front 20 prevents the airbag 100 from being caught by the upper end of the pillar trim 300, and allows the airbag 100 to be smoothly deployed while pushing a head liner 200.

Reference numeral 50 denotes a fastening part for fastening the ramp bracket to a vehicle body 400.

As described above, the present invention provides a ramp bracket for a curtain airbag, which is constructed so that the curtain airbag is firmly supported by a partition during a deployment, thus enabling the curtain airbag to be smoothly deployed between a head liner and a pillar trim without being hindered by a pillar trim.

Further, the present invention provides a ramp bracket for a curtain airbag, which is easily deformed when a passenger sitting in a passenger compartment collides with the ramp bracket in the event of a vehicle accident, thus absorbing the shocks applied to the passenger.

Furthermore, the present invention provides a ramp bracket for a curtain airbag, which has airbag deployment lines that are cut on a front at regular intervals, and prevents the airbag from being removed from the ramp bracket, thus achieving superior transportability when the airbag and the ramp bracket have been assembled with each other.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A ramp bracket for a curtain airbag, comprising:
   a front portion having airbag deployment lines formed in a horizontal direction;
   a rear portion placed behind the front portion with a space being formed between the rear portion and the front portion, the space being open at both left and right sides thereof; and a partition dividing the space into two portions that are an upper chamber and a lower chamber;

wherein a thickness of the partition is not constant so that a portion of the partition adjacent to the front portion is different from a portion of the partition adjacent to the rear portion; and wherein the rear portion comprises a support part which is bent from a lower end of an area defining the lower chamber and extends towards the front portion, the support part overlapping the front portion in back of the front portion.

2. The ramp bracket as set forth in claim 1, wherein a notch is formed at a portion bent from a lower end of the rear portion so that the support part is easily bent upwards.

3. The ramp bracket as set forth in claim 1, wherein the support part comprises:

a stopper provided on a front end of the support part in such a way as to be positioned between the partition and a skirt, and leaning on the skirt to withstand a force transmitted from the partition.

4. The ramp bracket as set forth in claim 3, wherein the stopper has on a top thereof a flat surface which is in surface contact with the partition.

5. The ramp bracket as set forth in claim 1, wherein the airbag deployment lines are lines which are cut at regular intervals so that a rupture is conducted along the lines.

6. A ramp bracket for a curtain airbag, comprising:

a front portion having airbag deployment lines formed in a horizontal direction;

a rear portion placed behind the front portion with a space being formed between the rear portion and the front portion, the space being open at both left and right sides thereof; and a partition dividing the space into two portions that are an upper chamber and a lower chamber;

wherein the front portion, rear portion and partition of an area defining the lower chamber are more rigid and thicker than the front of an area defining the upper chamber; and wherein the rear portion comprises a support part which is bent from a lower end of the area defining the lower chamber and extends towards the front portion, the support part overlapping the front portion in back of the front portion.

7. The ramp bracket as set forth in claim 6, wherein a notch is formed at a portion bent from a lower end of the rear portion so that the support part is easily bent upwards.

8. The ramp bracket as set forth in claim 6, wherein the support part comprises:

a stopper provided on a front end of the support part in such a way as to be positioned between the partition and a skirt, and leaning on the skirt to withstand a force transmitted from the partition.

9. The ramp bracket as set forth in claim 8, wherein the stopper has on a top thereof a flat surface which is in surface contact with the partition.

10. The ramp bracket as set forth in claim 6, wherein the airbag deployment lines are lines which are cut at regular intervals so that a rupture is conducted along the lines.

* * * * *